United States Patent
Kozaki et al.

(10) Patent No.: US 8,991,822 B2
(45) Date of Patent: Mar. 31, 2015

(54) SHEET CONVEYOR DEVICE

(71) Applicants: Daisuke Kozaki, Nagoya (JP); Takashi Ohama, Iwakura (JP); Ai Oyamada, Konan (JP); Takeru Morinaga, Seto (JP)

(72) Inventors: Daisuke Kozaki, Nagoya (JP); Takashi Ohama, Iwakura (JP); Ai Oyamada, Konan (JP); Takeru Morinaga, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/039,861

(22) Filed: Sep. 27, 2013

(65) Prior Publication Data

US 2014/0151953 A1 Jun. 5, 2014

(30) Foreign Application Priority Data

Nov. 30, 2012 (JP) .................................. 2012-262444

(51) Int. Cl.
  *B65H 5/02* (2006.01)
  *B65H 5/06* (2006.01)
  *B65H 1/08* (2006.01)

(52) U.S. Cl.
  CPC . *B65H 5/062* (2013.01); *B65H 1/08* (2013.01)
  USPC .......................................... 271/274; 271/273

(58) Field of Classification Search
  USPC ................................................. 271/274, 273
  See application file for complete search history.

(56) References Cited

U.S. PATENT DOCUMENTS

| 6,829,453 | B2 * | 12/2004 | Kouzu | ........................... 399/124 |
| 7,731,189 | B2 * | 6/2010 | Kuo et al. | ..................... 271/274 |
| 7,793,928 | B2 | 9/2010 | Ohama et al. | |
| 2005/0194731 | A1 | 9/2005 | Ohama et al. | |
| 2009/0189328 | A1 | 7/2009 | Ohama et al. | |
| 2012/0248681 | A1 * | 10/2012 | Kozaki et al. | ................. 271/109 |

FOREIGN PATENT DOCUMENTS

JP  4322709 B2  9/2009
JP  4810278 B2  11/2011

* cited by examiner

*Primary Examiner* — Michael McCullough
*Assistant Examiner* — Howard Sanders
(74) *Attorney, Agent, or Firm* — Banner & Witcoff, Ltd.

(57) ABSTRACT

A conveyor device includes a conveyor including a conveyor roller to convey a sheet along a conveyance path, a cover movable between a closed position where the cover covers the conveyor roller and an open position where the cover is separated from the conveyor roller. The conveyor further includes a pinch roller urged toward the conveyor roller when the cover is in the closed position. When the cover is in the closed position, the conveyor roller and the pinch roller define a nip point along the conveyance path. The conveyor device includes a holder supported by the cover and to rotatably support the pinch roller and an urging member disposed between the cover and the holder to move the holder away from the cover to urge the pinch roller toward the conveyor roller when the cover is in the closed position.

19 Claims, 14 Drawing Sheets

SHEET CONVEYOR DEVICE

CROSS-REFERENCE TO RELATED APPLICATION

This application claims priority from Japanese Patent Application No. 2012-262444, filed on Nov. 30, 2012, which is incorporated herein by reference.

FIELD OF DISCLOSURE

Aspects disclosed herein relate to a sheet conveyor.

BACKGROUND

A known sheet conveyor includes a processing portion that is configured to perform processing onto a sheet and a conveyor device that is configured to convey a sheet along a conveyance path for guiding the sheet to the processing portion. The conveyor device includes a conveyor roller and a pinch roller. More specifically, the conveyor roller and the pinch roller are configured to eject the sheet on which processing has been performed by the processing portion from the conveyance path. The conveyor roller and the pinch roller face each other while the conveyance path is interposed therebetween, and define a nip point therebetween. The conveyor roller is configured to be driven to rotate. The pinch roller is urged toward the conveyor roller and is configured to be rotated following the rotation of the conveyor roller.

The sheet conveyor further includes a cover and an urging device. The cover is configured to be movable between a closed position where the cover covers the conveyor roller and an open position where the cover is separated from the conveyor roller to expose the conveyor roller. The cover supports the pinch roller to be rotatable. The urging device is disposed between the cover and the pinch roller. The urging device is configured to urge the pinch roller toward the conveyor roller when the cover is located at the closed position. The cover includes a guide portion that is configured to guide a sheet toward the nip point from a position upstream of the nip point in the conveyance path.

In the known sheet conveyor, the guide portion guides the sheet on which processing has been performed toward the nip point from the position upstream of the nip point in the conveyance path. Then, the conveyor roller and the pinch roller convey the sheet guided by the guide portion to a position downstream of the nip point in the conveyance path to eject the sheet from the conveyance path.

SUMMARY

In the known sheet conveyor, the urging device disposed between the cover and the pinch roller urges the pinch roller toward the conveyor roller. With this configuration, reaction of the urging device may act on the cover and thus the cover may be deformed. The cover includes the guide portion. Therefore, when such a situation occurs, the guide portion may be deformed and/or the guide portion may be displaced from a proper position due to the deformation of the cover. Consequently, the conveyance path may define an improper sheet conveyance route therein and thus the sheet conveyance may become unstable. Thus, in the known sheet conveyor, a paper jam may tend to occur and/or the quality of processing performed on the sheet may be degraded.

Accordingly, aspects disclosed herein provide for a sheet conveyor that conveys a sheet smoothly and reduces quality degradation of processing performed onto a sheet.

DESCRIPTION OF THE DRAWINGS

For a more complete understanding of the present disclosure, needs satisfied thereby, and the objects, features, and advantages thereof, reference now is made to the following illustrative descriptions taken in connection with the accompanying drawings.

DETAILED DESCRIPTION

An illustrative embodiment in which aspects of the disclosure are implemented is described in detail with reference to the accompanying drawings, like numerals being used for like corresponding parts in the various drawings.

Figure 1:
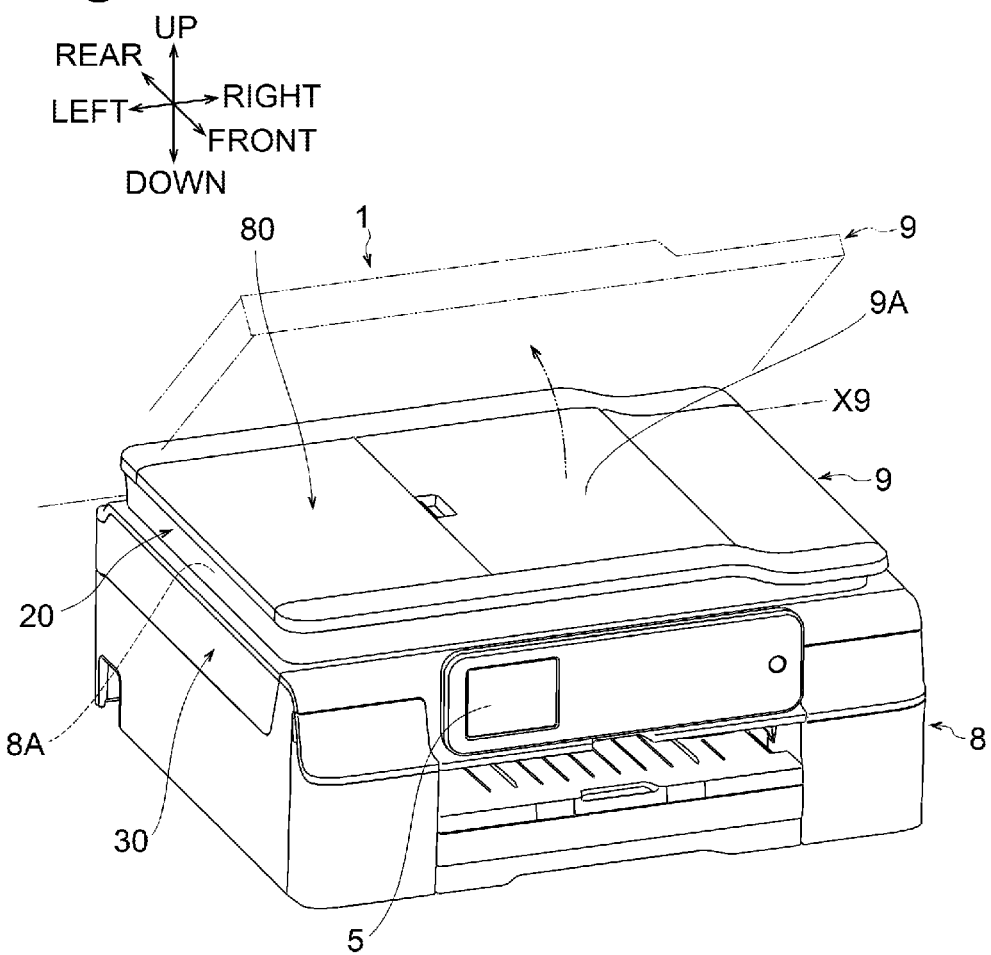
FIG. 1 is a perspective view depicting an image reader in an illustrative embodiment according to one or more aspects of the disclosure.

As depicted in FIG. 1, an image reader 1 may be an example of a sheet conveyor. In FIG. 1, a side of the image reader 1, in which a control panel 5 may be disposed, may be defined as the front of the image reader 1. A side of the image reader 1 facing the left-hand side may be defined as the left of the image reader 1 as viewed from the control panel 5. A front-rear direction, a right-left direction, and an up-down direction may be defined with reference to the front and the left of the image reader 1. Directions indicated in FIGS. 2 to 14 correspond to the directions indicated in FIG. 1, respectively. Hereinafter, referring to FIG. 1, components of the image reader 1 are described.

Figure 2:
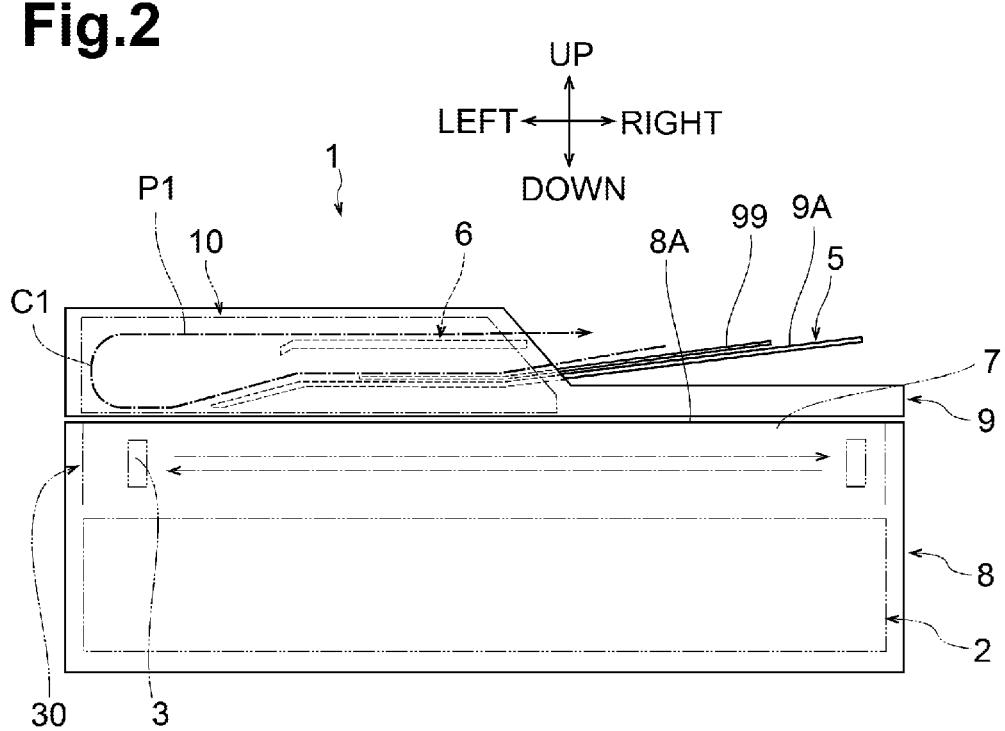
FIG. 2 is a schematic side view depicting the image reader in the illustrative embodiment according to one or more aspects of the disclosure.
Figure 3:
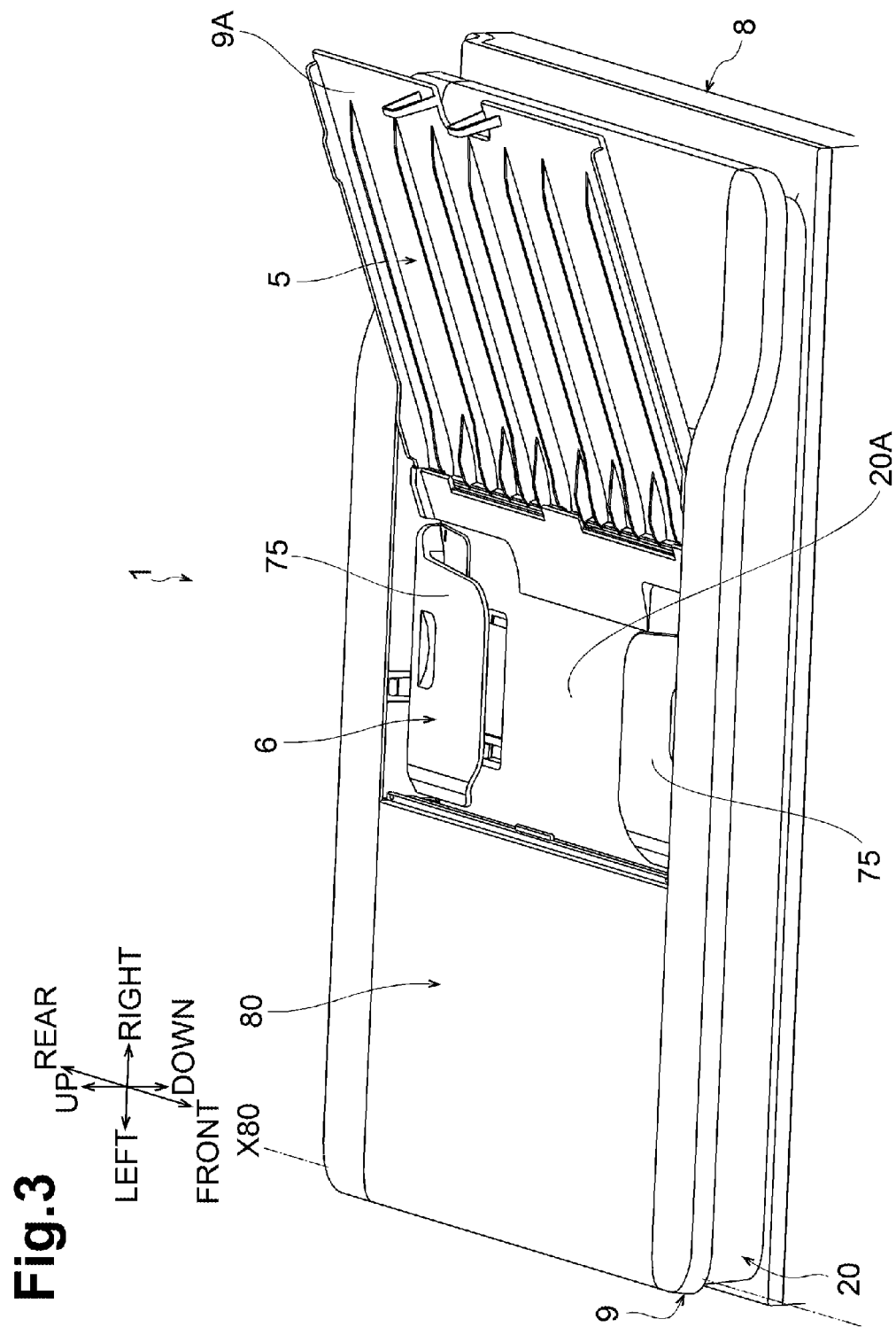
FIG. 3 is a partial perspective view depicting the image reader in the illustrative embodiment according to one or more aspects of the disclosure, wherein a document mount is opened.
Figure 4:
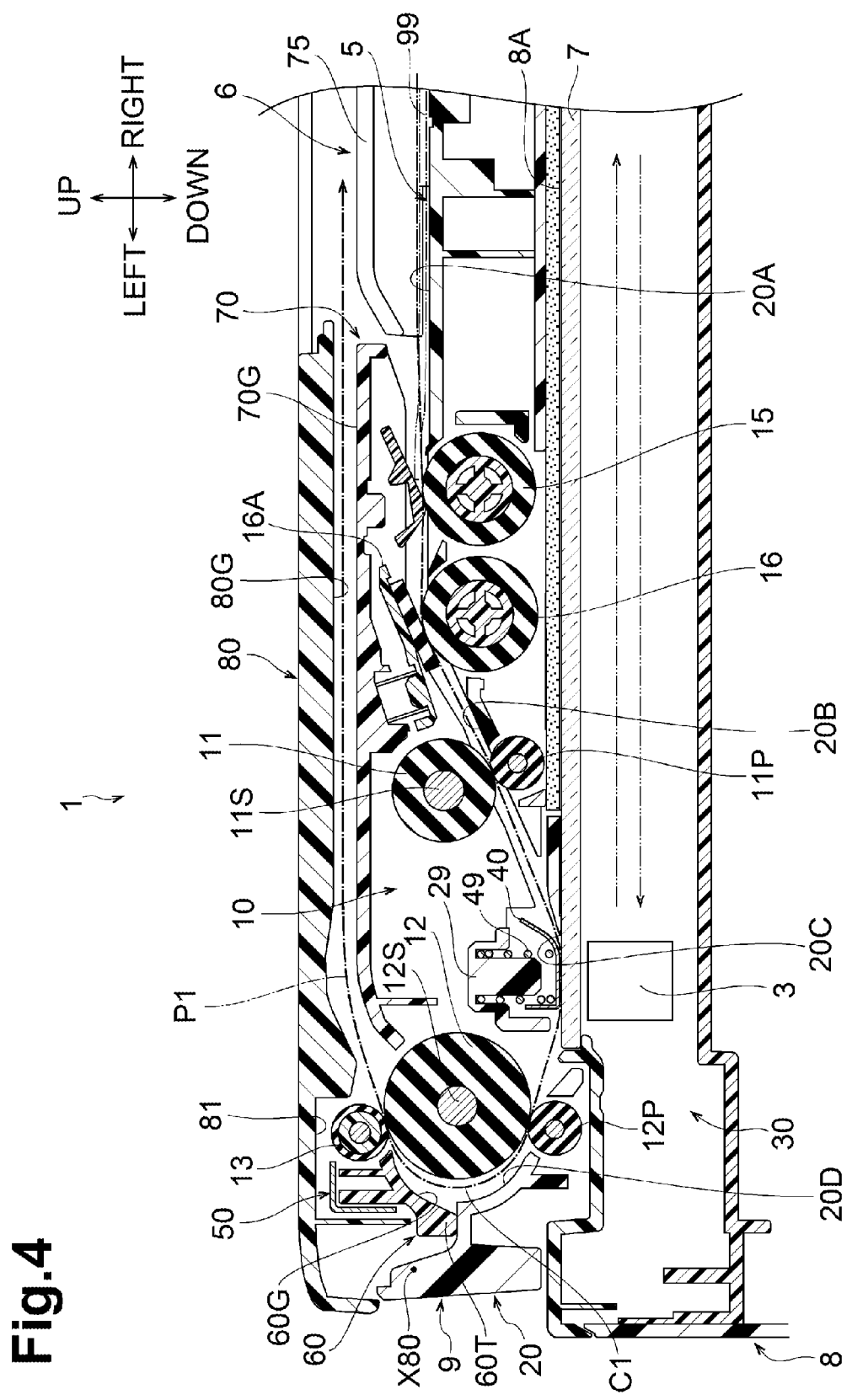
FIG. 4 is a partial schematic cross sectional view depicting the image reader in the illustrative embodiment according to one or more aspects of the disclosure.

As depicted in FIGS. 1 to 4, the image reader 1 may comprise a main body 8 and an openable portion 9. The main body 8 may have a substantially flat box shape and may comprise the control panel 5 at its front, as depicted in FIG. 1. As depicted in FIGS. 2 and 4, the main body 8 may comprise a reading unit 30 in its upper portion. The reading unit 30 may comprise a platen glass 7 as its upper surface. The platen glass 7 may comprise a support surface 8A at its upper surface. The support surface 8A may be configured to support a document to be read, such as a sheet or a book, thereon, when the reading unit 30 reads the stationary document.

As depicted in FIG. 1, the openable portion 9 may be supported by the main body 8 via a hinge (not depicted) disposed at an upper edge of a rear surface of the main body 8. The openable portion 9 may be configured to swing about an axis X9 extending along the right-left direction. As indicated by a solid line in FIG. 1, the openable portion 9 may cover the support surface 8A from above when the openable portion 9 is closed. The openable portion 9 may be configured such that its forward portion may be moved upward and rearward by swinging about the axis X9. As indicated by a double-dotted-and-dashed line in FIG. 1, the openable portion 9 may expose an upper surface of the support surface 8A when the forward part of the openable portion 9 is located at the upwardly-rearward position. With the exposure of the upper surface of the support surface 8A, a user may be allowed to place a document to be read on the support surface 8A.

As depicted in FIGS. 2 to 6, the image reader 1 may further comprise a supply portion 5, a reading portion 3, an output portion 6, and an automatic document conveyor mechanism 10. The reading portion 3 may be an example of a "processing portion". The automatic document conveyor mechanism 10 may be an example of a "conveyor device".

As depicted in FIGS. 2 and 4, the reading portion 3 may be accommodated in the reading unit 30. A known image reading sensor, e.g., a contact image sensor ("CIS") or a charge-coupled device ("CCD"), may be adopted as the reading portion 3. The reading portion 3 may be configured to reciprocate along the right-left direction under the platen glass 7 by a scanning mechanism (not depicted). When a document placed on the support surface 8A is read by the reading portion 3, as depicted in FIG. 2, the scanning mechanism may operate to move the reading portion 3 from a left end to a right end in the reading unit 30. When an image is read by the reading portion 3 from each of a plurality of sheets 99, i.e., a plurality of documents to be read, placed on the supply portion 5, the scanning mechanism may operate to move the reading portion 3 to the left end in the reading unit 30. The position of the reading portion 3 depicted in FIGS. 2 and 4 may be a fixed position.

As depicted in FIGS. 1 to 4, the image reader 1 may further comprise a document mount 9A, a base 20, a guide member 70, and a cover 80, each of which may comprise resin material. The image reader 1 may further comprise a holder 60 (see FIGS. 4 to 14), compression coil springs 69A and 69B (see FIGS. 8, 11, and 14), and a stiff member 50 (see FIGS. 4, 8, 9, and 11 to 14). The compression coil springs 69A and 69B may be an example of an "urging device". The front compression coil spring 69A may be an example of a "first urging device". The rear compression coil spring 69B may be an example of a "second urging device".

As depicted in FIGS. 1 to 3, the document mount 9A may be disposed at a top of the openable portion 9 and may be configured to be opened and closed. The document mount 9A may constitute the supply portion 5 when opened. The opened document mount 9A (i.e., the supply portion 5) may be configured to support one or more sheets 99 thereon when an image is read from the one or more sheets 99 by the reading portion 3 while the sheets 99 are conveyed one by one by the automatic document conveyor mechanism 10. The sheet 99 may comprise paper and an overhead projector ("OHP") sheet. The document mount 9A may constitute a portion of an upper exterior of the openable portion 9 when closed.

Figure 5:
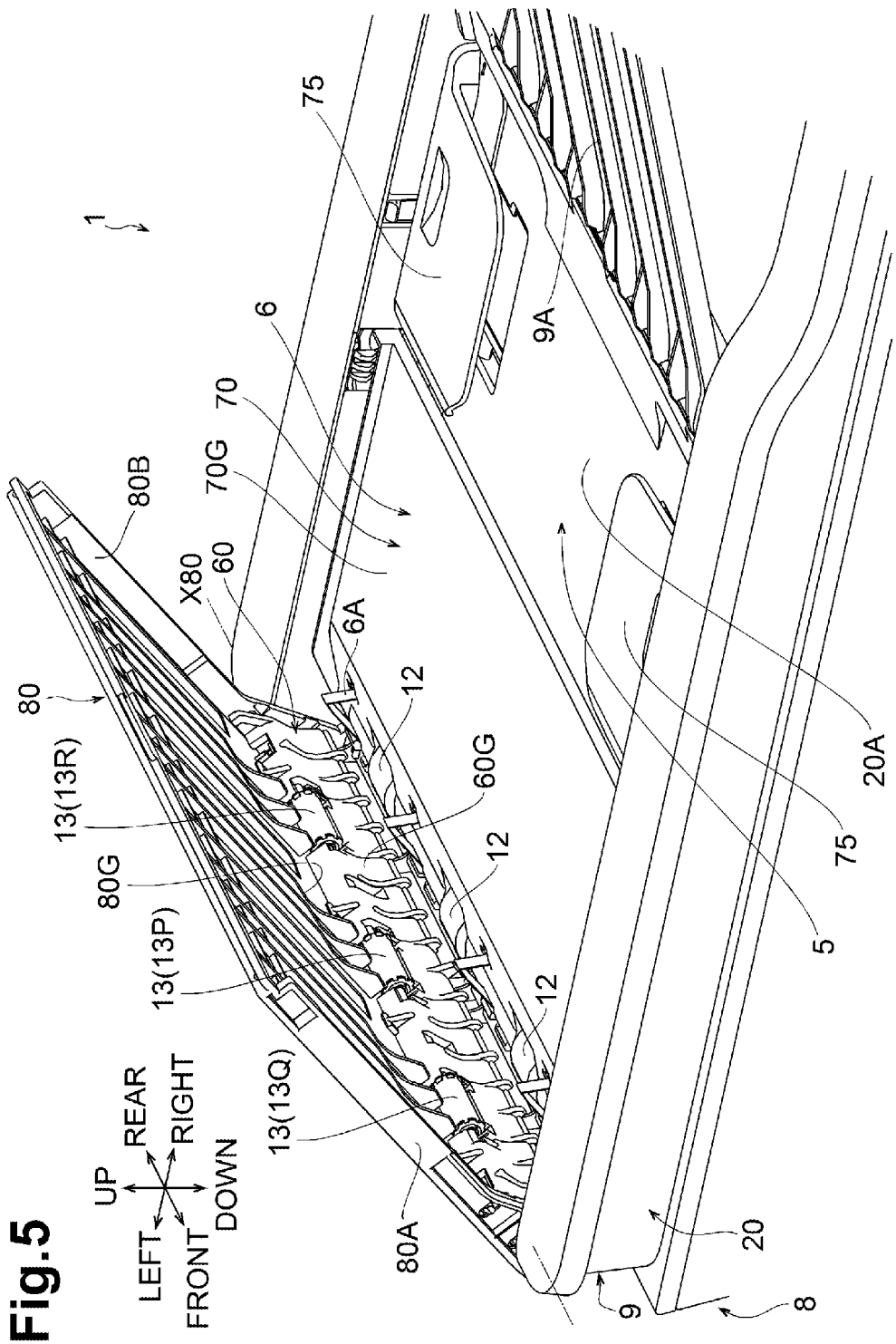
FIG. 5 is a partial perspective view depicting a cover located at an open position and its surroundings in the image reader in the illustrative embodiment according to one or more aspects of the disclosure.

As depicted in FIGS. 3 to 5, the base 20 may constitute a lower portion of the openable portion 9. The base 20 may have a substantially flat plate-like shape and extend to cover the support surface 8A entirely. The base 20 may be configured to accommodate the automatic document conveyor mechanism 10 therein.

As depicted in FIG. 3, the base 20 may comprise a support surface 20A at its upper surface. The support surface 20A may be connected to a left end of the opened document mount 9A and extend substantially horizontally toward the left from the connecting portion. The support surface 20A may be configured to support, from below, one or more sheets 99 placed on the document mount 9A. The support surface 20A may also constitute the supply portion 5 in cooperation with the opened document mount 9A.

As depicted in FIG. 4, the base 20 may comprise an inclined surface 20B, a curved surface 20D, and an urging member support portion 29 and may have an opening 20C therein. The inclined surface 20B may be disposed to the left of the support surface 20A and continued from the support surface 20A. The inclined surface 20B may be inclined leftward and downward. The opening 20C may have a rectangular shape elongated in the front-rear direction and may be defined to the left of the inclined surface 20B. The curved surface 20D may be disposed to the left of the opening 20C and may be curvedly inclined leftward and upward. The urging member support portion 29 may be disposed above the opening 20C. The urging member support portion 29 may be elongated in the front-rear direction and may be bridged over the opening 20C in the front-rear direction.

An urging member 40 may be disposed below the urging member support portion 29. The urging member 40 may be supported by the urging member support portion 29 to be movable in the up-down direction. The urging member 40 may face the reading portion 3 located at the fixed position via the opening 20C and an exposed portion of the platen glass 7 through the opening 20C.

A compression coil spring 49 may be disposed between the urging member support portion 29 and the urging member 40. An upper end of the compression coil spring 49 may be retained by the urging member support portion 29. A lower end of the compression coil spring 49 may be in contact with the urging member 40. The compression coil spring 49 may be configured to urge the urging member 40 downward, that is, toward the reading portion 3.

Figure 6:
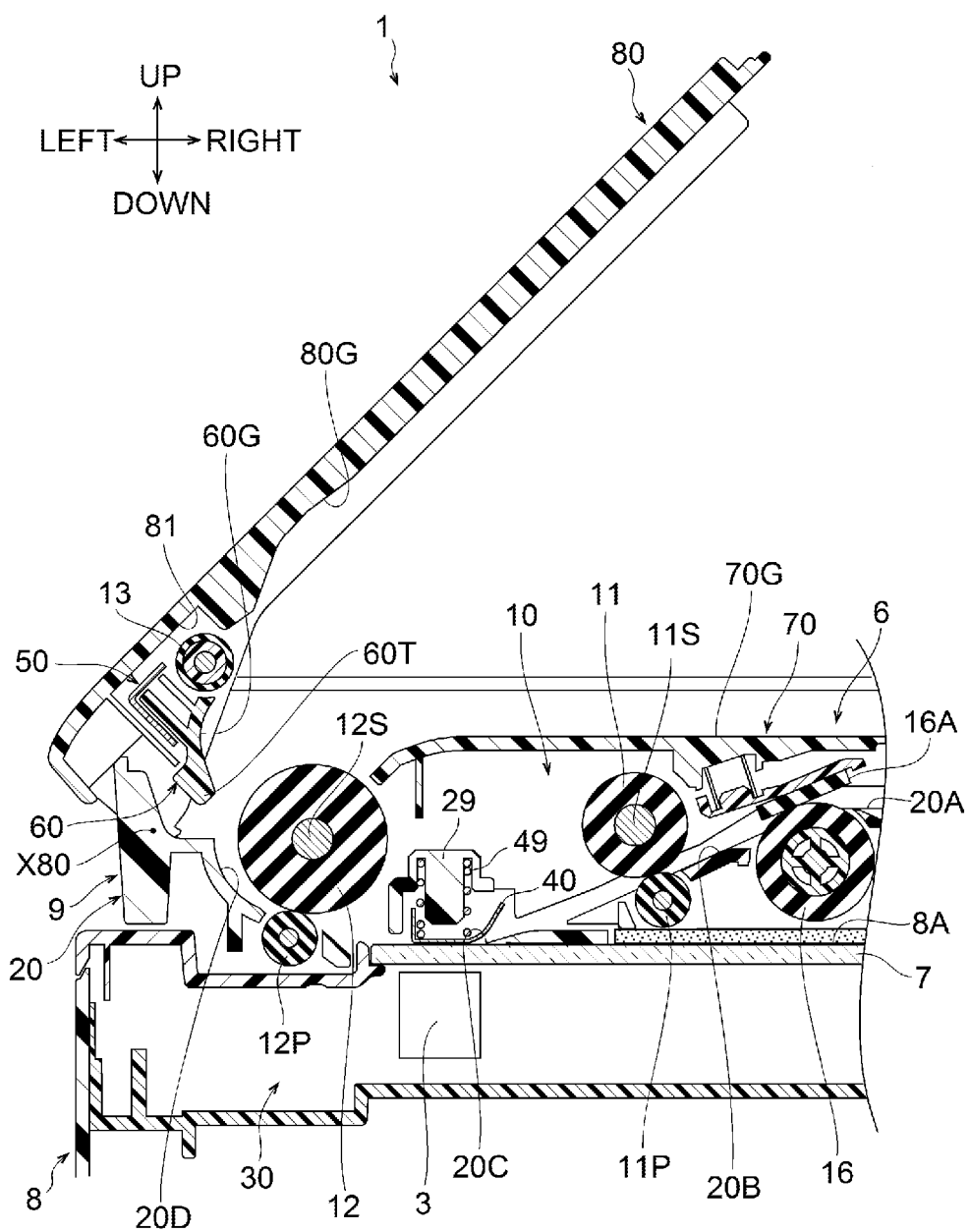
FIG. 6 is a partial schematic cross sectional view depicting the cover located at the open position and its surroundings in the image reader in the illustrative embodiment according to one or more aspects of the disclosure.

As depicted in FIGS. 4 to 6, the guide member 70 may be disposed above a leftward portion of the support surface 20A, the inclined surface 20B, the opening 20C and the urging member support portion 29, and may extend in the front-rear and right-left directions. The guide member 70 may be disposed above the base 20 while being bridged over the support surface 20A in the front-rear direction and its front and rear end portions may be fixed to the base 20. The guide member 70 may comprise a guide surface 70G. The guide surface 70G may extend substantially horizontally and serve as an upper surface of the guide member 70.

As depicted in FIGS. 1 to 6, the cover 80 may be supported by the base 20 and configured to pivot about an axis X80 to be opened and closed. The axis X80 may extend in the front-rear direction at a left end portion of the cover 80. The cover 80 may be configured to be movable between a position where the cover 80 may be located over the guide member 70 and extend in the front-rear and right-left directions as depicted in FIGS. 1 to 4 and a position where the cover 80 may be opened up separately from the guide member 70 as depicted in FIGS. 5 and 6.

The position where the cover 80 is located in FIGS. 1 to 4 may be referred to as a closed position. In the closed position, the cover 80 may be configured to cover, from above, a plurality of, for example, three, ejection rollers 12 and the guide surface 70G that may constitute the automatic document conveyor mechanism 10. Each of the ejection rollers 12 may be an example of a "conveyor roller". The position where the cover 80 is located in FIGS. 5 and 6 may be referred to as an open position. In the open position, the cover 80 may be configured to expose the ejection rollers 12 and the guide surface 70G while being separated upward from the ejection rollers 12. The up-down direction and the right-left direction used in the description of the cover 80 may be defined with reference to the closed position of the cover 80.

More specifically, as depicted in FIGS. 7 to 14, the cover 80 may comprise a flat-plate portion 80S, a front wall portion 80A, a rear wall portion 80B, and a partition wall portion 80C, a cover-side guide portion 80G that may be molded integrally with each other.

The flat-plate portion 80S may have a substantially rectangular plate-like shape extending in the front-rear and right-left directions. The front wall portion 80A may be bent downward at substantially right angles from a front end of the flat-plate portion 80S and extend in the right-left direction. The rear wall portion 80B may be bent downward at a substantially right angles from a rear end of the flat-plate portion 80S and extend in the right-left direction. The partition wall portion 80C may protrude downward from the flat-plate portion 80S at a position slightly shifted rightward of a left end of the flat-plate portion 80S. The partition wall portion 80C may extend in the front-rear direction and may be connected to the front wall portion 80A and the rear wall portion 80B.

Figure 7:
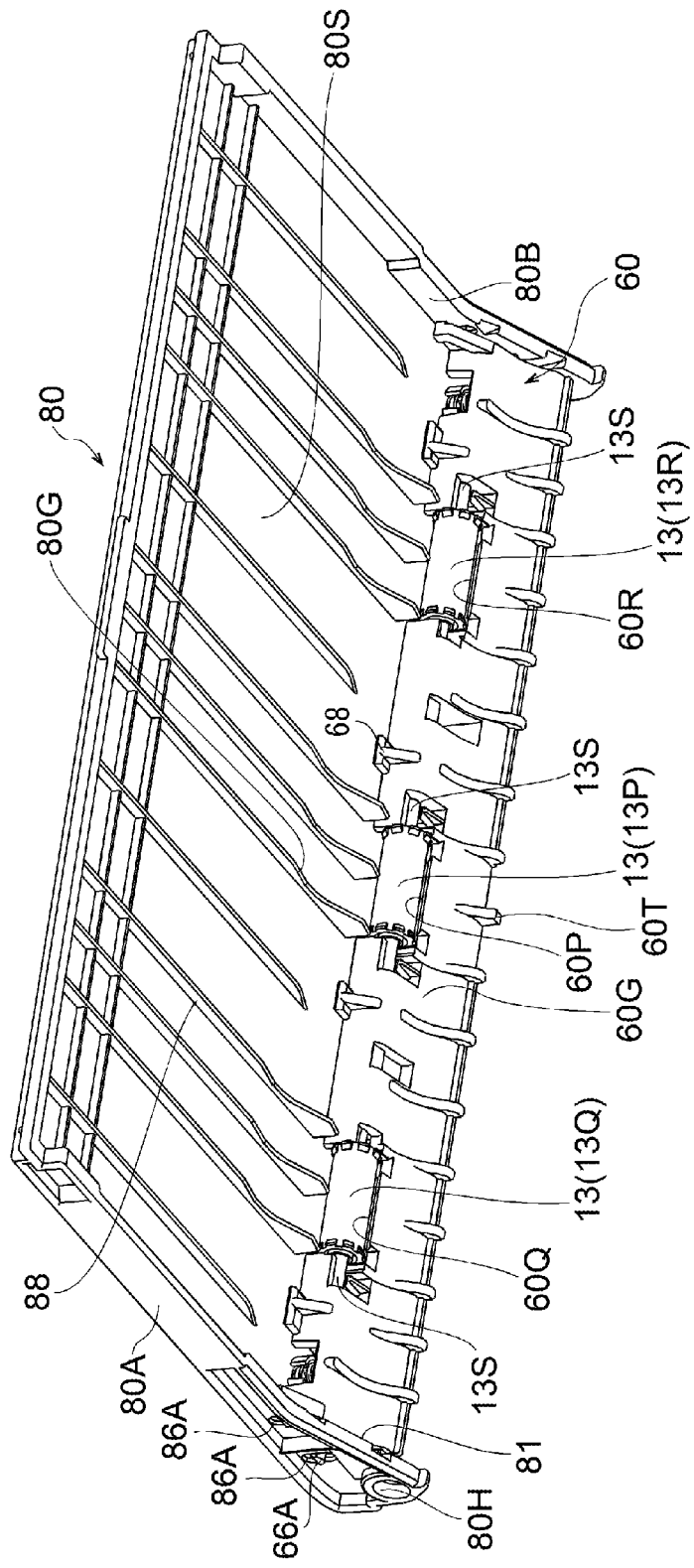
FIG. 7 is a perspective view depicting the cover, a holder and pinch rollers of the image reader in the illustrative embodiment according to one or more aspects of the disclosure.
Figure 8:
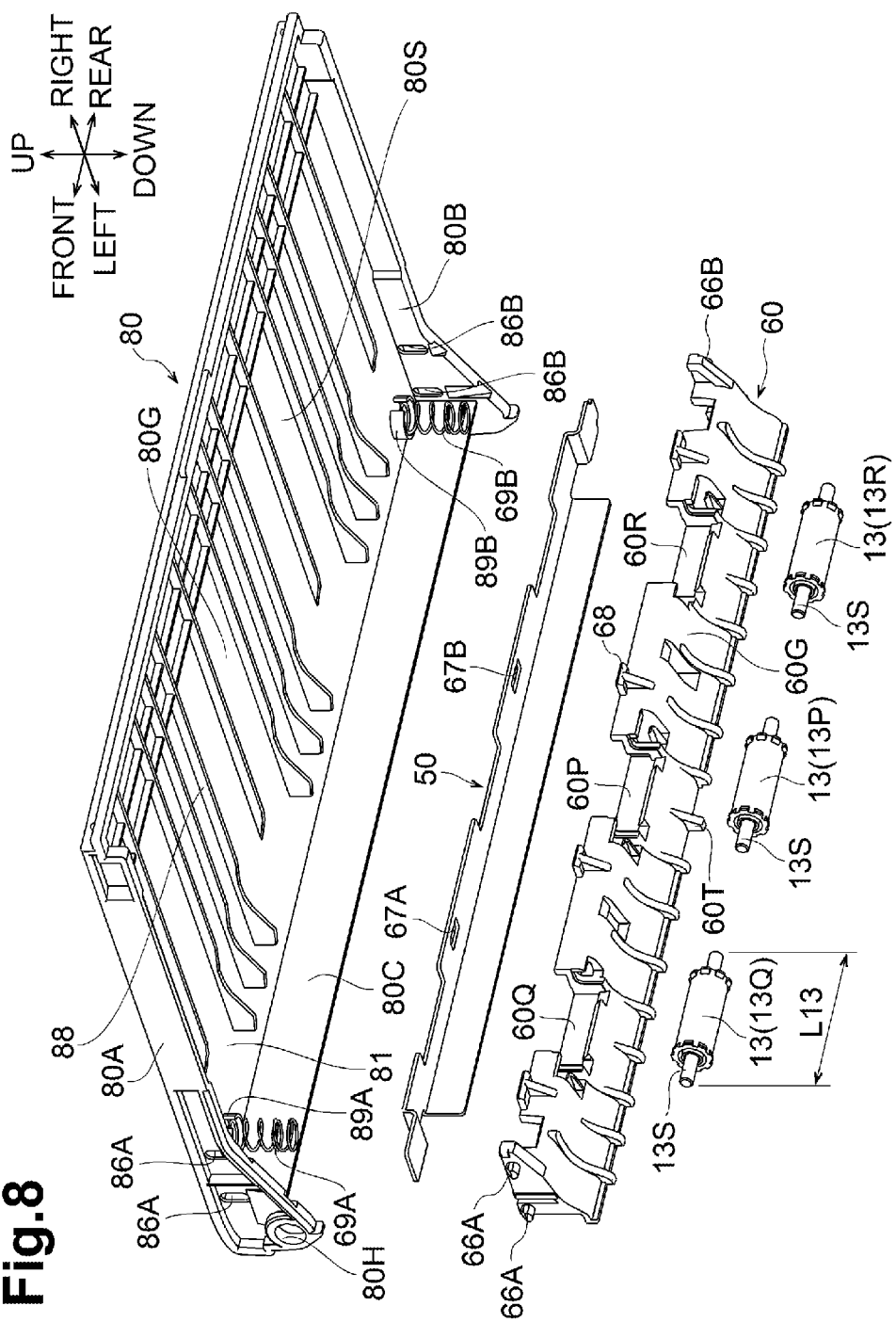
FIG. 8 is a disassembled perspective view depicting the cover, urging devices, a stiff member, the holder, and the pinch rollers of the image reader in the illustrative embodiment according to one or more aspects of the disclosure.
Figure 9:
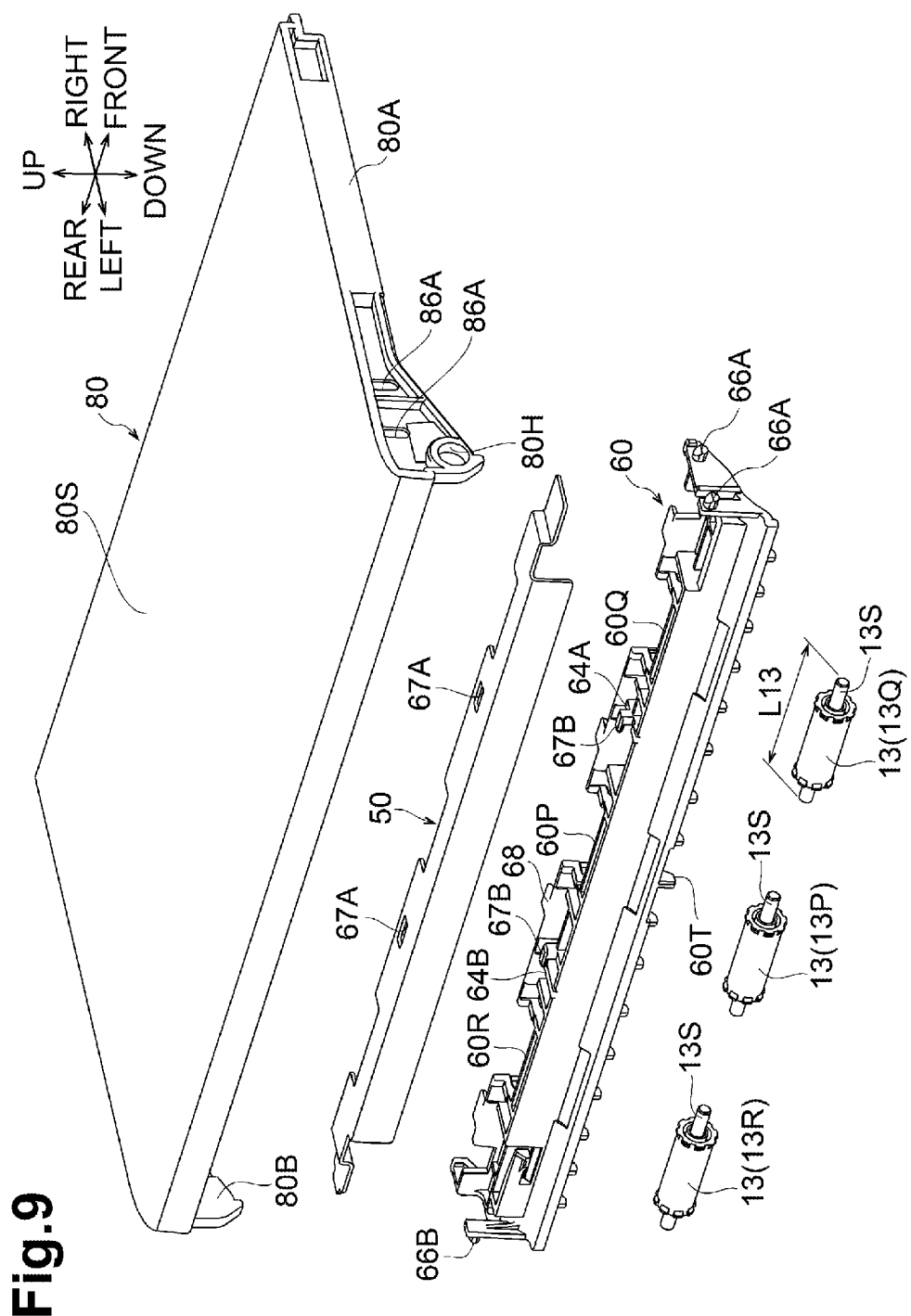
FIG. 9 is a disassembled perspective view depicting the cover, the urging devices, the stiff member, the holder and the pinch rollers of the image reader in the illustrative embodiment according to one or more aspects of the disclosure.

As depicted in FIGS. 7 to 9, a left end portion of each of the front wall portion 80A and the rear wall portion 80B may protrude downward and have a recessed support hole 80H in its lower end portion. In FIGS. 7 to 9, the front support hole 80H is depicted and the rear support hole 80H is omitted therefrom. The rear support hole 80H may be disposed in a similar manner. The cover 80 may be supported by the base 20 such that the cover 80 may be swingable about the axis X80 while support shafts (not depicted) disposed at the base 20 may be engaged in the respective support holes 80H of the front wall portion 80A and the rear wall portion 80B.

As depicted in FIG. 8, the flat-plate portion 80S may comprise a plurality of ribs 88 protruding downward therefrom. The ribs 88 may extend in the right-left direction and may be spaced apart from each other in the front-rear direction. A left end of each rib 88 may be separated rightward from the partition wall portion 80C. End surfaces, facing downward, of the ribs 88 may define the cover-side guide portion 80G. The cover-side guide portion 80G may face the guide surface 70G from above when the cover 80 is closed.

As depicted in FIGS. 4, 8, and 11 to 14, the cover 80 may comprise a holder accommodation portion 81. The holder accommodation portion 81 may be a space enclosed with the flat-plate portion 80S, the front wall portion 80A, the rear wall portion 80B, the partition wall portion 80C, and the left ends of the ribs 88.

As depicted in FIGS. 8 and 9, the front wall portion 80A may have a plurality of, for example, two, slots 86A in its portion defining the holder accommodation portion 81. Each slot 86A may penetrate the front wall portion 80A in the front-rear direction and be elongated in the up-down direction. The rear wall portion 80B may have a plurality of, for example, two, slots 86B in its portion defining the holder accommodation portion 81. Each slot 86B may penetrate the rear wall portion 80B in the front-rear direction and be elongated in the up-down direction.

Figure 11:
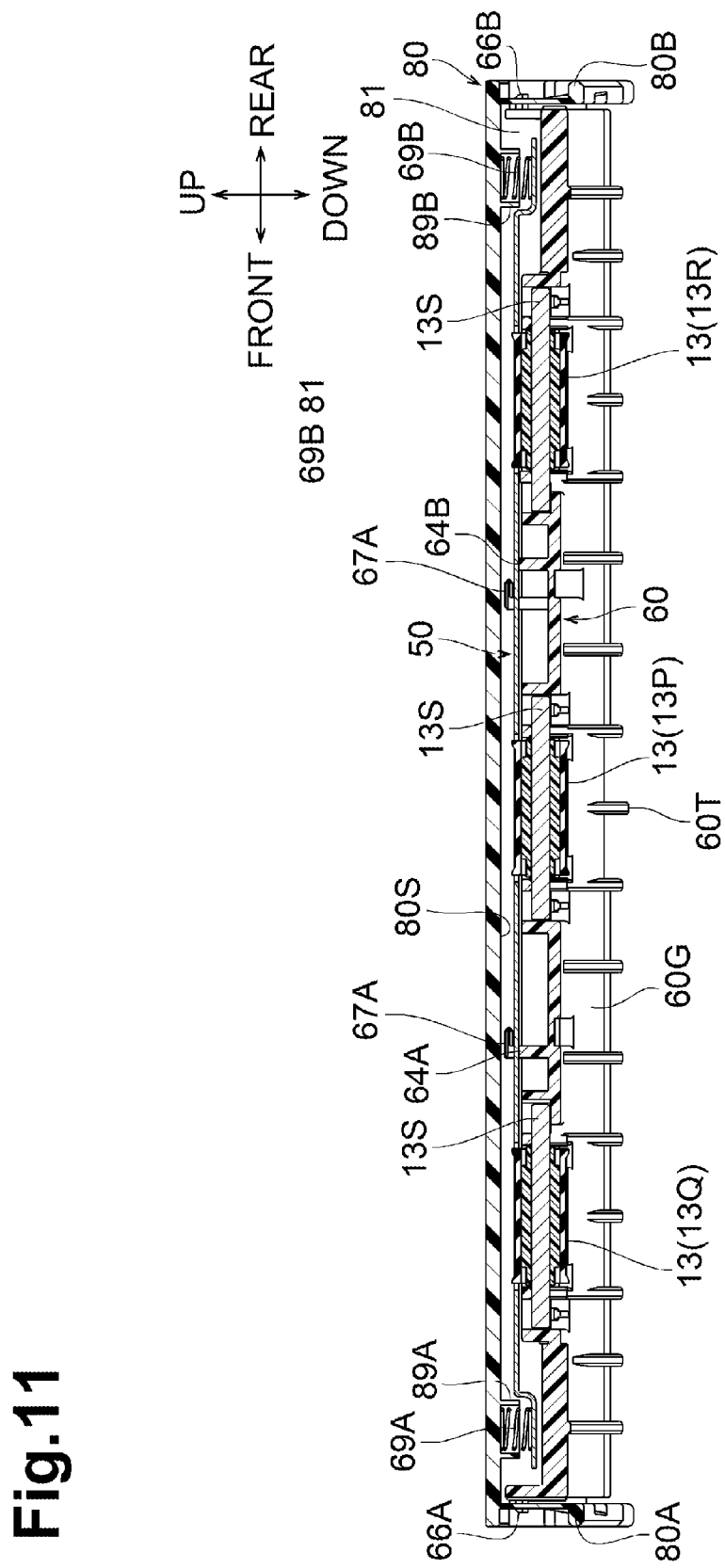
FIG. 11 is a cross sectional view depicting the image reader taken along line XI-XI in FIG. 10 in the illustrative embodiment according to one or more aspects of the disclosure.
Figure 14:
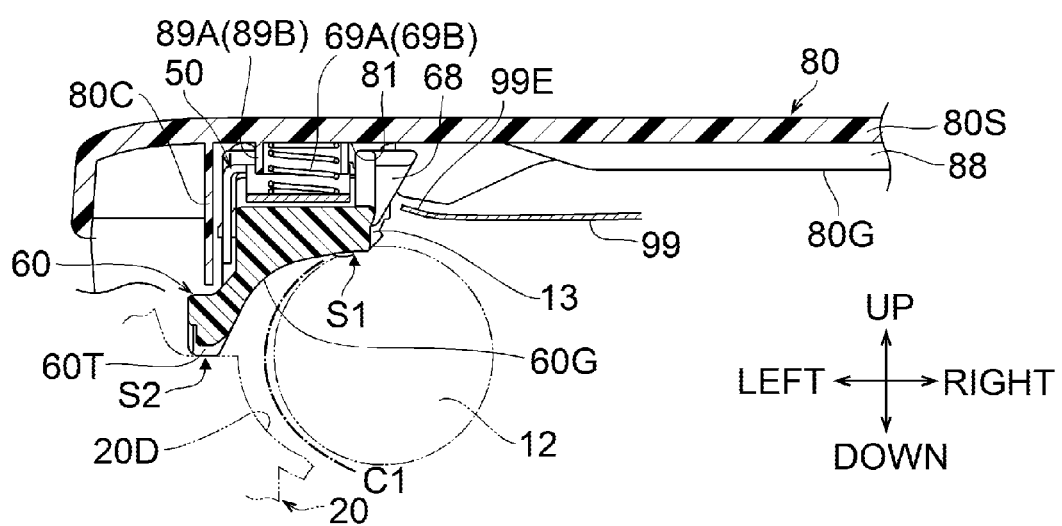
FIG. 14 is a partial cross sectional view depicting the image reader taken along line XIV-XIV in FIG. 10 in the illustrative embodiment according to one or more aspects of the disclosure.

As depicted in FIGS. 8, 11, and 14, the flat-plate portion 80S may comprise a plurality of, for example, two, spring retainer portions 89A and 89B at its portion defining the holder accommodation portion 81. The front spring retainer portion 89A may have a substantially cylindrical shape and protrude downward from a vicinity of the slots 86A. The rear spring retainer portion 89B may have a substantially cylindrical shape and protrude downward from a vicinity of the slots 86B.

The compression coil spring 69A may be located at the forward position and an upper end of the compression coil spring 69A may be retained by the front spring retainer portion 89A. The compression coil spring 69B may be located at the rearward position and an upper end of the compression coil spring 69B may be retained by the rear spring retainer portion 89B.

As depicted in FIGS. 8 to 11, the holder 60 may comprise a resin member elongated in the front-rear direction. A dimension in the front-rear direction of the holder 60 may be the same or substantially the same as a dimension in a width direction of a sheet 99 having a maximum size that may be available to be conveyed in the image reader 1. The holder 60 may comprise a plurality of, for example, two, guide shaft portions 66A on a front end surface thereof. Each guide shaft portion 66A may have a short length and protrude forward. The holder 60 may comprise a plurality of, for example, two, guide shaft portions 66B on a rear end surface thereof. Each guide shaft portion 66B may have a short length and protrude rearward.

Figure 10:
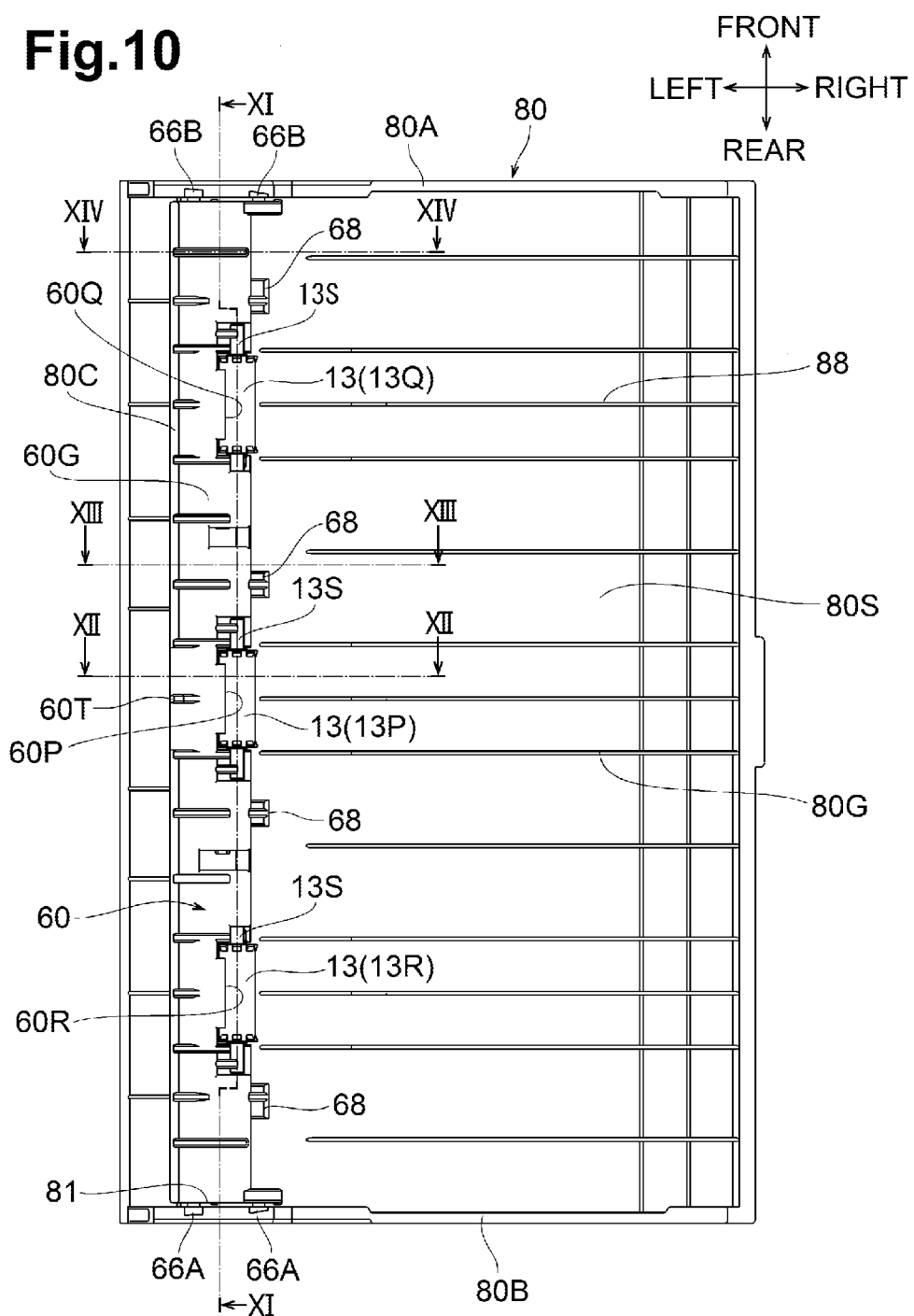
FIG. 10 is a bottom view depicting the cover, the holder and the pinch rollers of the image reader in the illustrative embodiment according to one or more aspects of the disclosure.

As depicted in FIGS. 7, 10, and 11, the holder 60 may be supported by the cover 80 such that the holder 60 may be movable in the up-down direction while the holder 60 may be accommodated in the holder accommodation portion 81 of the cover 80 and the guide shaft portions 66A and 66B may be engaged in the respective slots 86A and 86B. In this state, the front end surface of the holder 60 may be located adjacent to the front wall portion 80A and the rear end surface of the holder 60 may be located adjacent to the rear wall portion 80B.

As depicted in FIGS. 7 to 12, the holder 60 may be configured to support a plurality of, for example, three, ejection pinch rollers 13 rotatably. The ejection pinch rollers 13 may constitute the automatic document conveyor mechanism 10. Each ejection pinch roller 13 may be an example of a "pinch roller".

More specifically, the ejection pinch rollers 13 may comprise a first pinch roller 13P, a second pinch roller 13Q, and a third pinch roller 13R. The first pinch roller 13P may be disposed at a substantially middle position of the holder 60 in the front-rear direction. The second pinch roller 13Q may be disposed at a forward position of the holder 60 in the front-rear direction. The third pinch roller 13R may be disposed at a rearward position of the holder 60 in the front-rear direction.

Each ejection pinch roller 13 may comprise a rotation shaft 13S. The holder 60 may comprise rotation-shaft retainer portions 60P, 60Q, and 60R at a right end surface thereof. The rotation-shaft retainer portions 60P, 60Q, and 60R may be spaced apart from each other in the front-rear direction. The rotation-shaft retainer portions 60P, 60Q, and 60R may be recessed and configured to accommodate the first pinch roller 13P, the second pinch roller 13Q, and the third pinch roller 13R therein, respectively. The rotation-shaft retainer portions 60P, 60Q, and 60R may be further configured to support the respective rotation shafts 13S rotatably.

The rotation shafts 13S of the first pinch roller 13P, the second pinch roller 13Q, and the third pinch roller 13R may be arranged on the same axis extending along the front-rear direction when the rotation shafts 13S are supported rotatably by the respective rotation-shaft retainer portions 60P, 60Q, and 60R. That is, a dimension of a length L13 of each rotation shaft 13S may be one-third of a length of the holder 60 in the front-rear direction and shorter than the dimension of the width of the sheet 99 having the maximum size that may be available to be conveyed in the image reader 1.

As depicted in FIGS. 8 and 9, the stiff member 50 may comprise a steel sheet that may be pressed and bent. That is, the stiff member 50 may have stiffness higher than the holder 60 comprising resin material. The stiff member 50 may have a plurality of, for example, two, rectangular holes 51A and 51B in a middle portion thereof in the front-rear direction. The rectangular holes 51A and 51B may be elongated in the front-rear direction. The rectangular holes 51A and 51B may be spaced apart from each other in the front-rear direction and penetrate the stiff member 50 in the up-down direction.

As depicted in FIGS. 9 and 11, the holder 60 may comprise hooks 67A and 67B at its top. The stiff member 50 may be configured to be locked in the holder 60 while the hooks 67A and 67B of the holder 60 maybe engaged in the rectangular holes 51A and 51B, respectively, of the stiff member 50 with the stiff member 50 placed on an upper side of the holder 60. When the stiff member 50 is locked in the holder 60, the stiff member 50 may be fixed in contact with support portions 64A and 64B of the holder 60 in the up-down direction. The support portions 64A and 64B may be upper end surfaces of ribs disposed at the upper side of the holder 60. The front support portion 64A may be disposed between the first pinch roller 13P and the second pinch roller 13Q. The rear support portion 64B may be disposed between the first pinch roller 13P and the third pinch roller 13R. That is, the holder 60 and the stiff member 50 may be in contact with each other between the first pinch roller 13P and the second pinch roller 13Q and between the first pinch roller 13P and the third pinch roller 13R in the up-down direction.

As depicted in FIGS. 8 and 9, a front end portion of the stiff member 50 may be cranked downward and protrude toward the front. A rear end portion of the stiff member 50 may be cranked downward and protrude toward the rear.

As depicted in FIGS. 11 and 14, a lower end of the compression coil spring 69A may be in contact with the front end portion of the stiff member 50 from above. A lower end of the compression coil spring 69B may be in contact with the rear end portion of the stiff member 50. The front and rear end portions of the stiff member 50 may be spaced apart from the holder 60 in the up-down direction.

Thus, the stiff member 50 may be disposed between the compression coil springs 69A and 69B and the holder 60, and configured to receive downward urging force of the compression coil springs 69A and 69B by its front and rear end portions, respectively, and transmit the downward urging force to the holder 60 via the support portions 64A and 64B of the holder 60. The compression coil springs 69A and 69B may be disposed between the cover 80 and the holder 60, and more specifically, between the cover 80 and the stiff member 50, and configured to separate the holder 60 downward from the holder accommodation portion 81 of the cover 80 by the downward urging force thereof.

The ejection pinch rollers 13 rotatably supported by the holder 60 may be disposed above the ejection rollers 12, respectively. The ejection pinch rollers 13 may be stopped in contact with the respective ejection rollers 12 and urged against the respective ejection rollers 12 by the downward urging force of the compression coil springs 69A and 69B.

Figure 12:
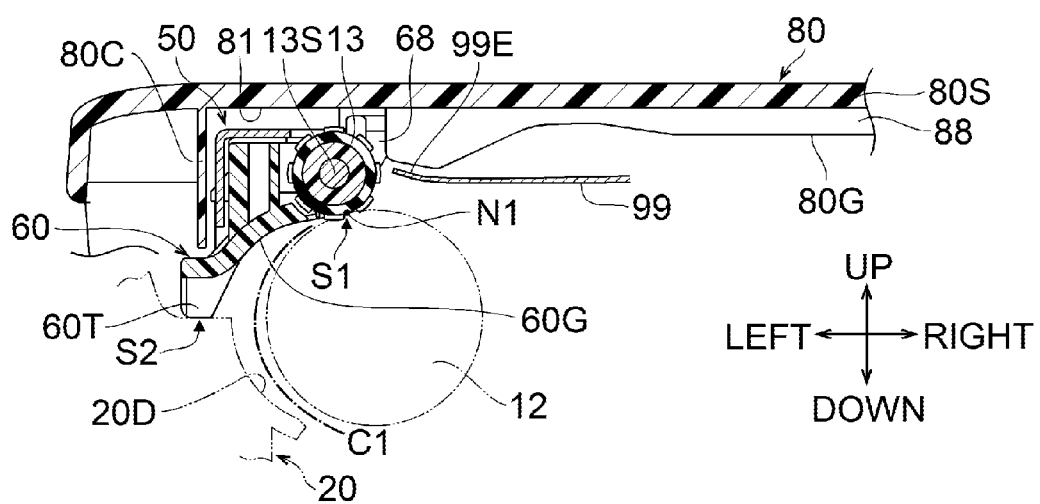
FIG. 12 is a partial cross sectional view depicting the image reader taken along line XII-XII in FIG. 10 in the illustrative embodiment according to one or more aspects of the disclosure.

As depicted in FIGS. 7 to 12, the holder 60 may comprise a contact portion 60T protruding downward from a middle portion of a lower end thereof. As depicted in FIG. 12, when the holder 60 is separated downward from the holder accommodation portion 81 by the downward urging force of the compression coil springs 69A and 69B, the contact portion 60T may be stopped in contact with an upper left end of the base 20 from above.

As depicted in FIGS. 4, 8, 10, and 13, the holder 60 may comprise a guide portion 60G at its surface facing the ejection rollers 12. The guide portion 60G may be connected to the curved surface 20D of the base 20 and curvedly and upwardly inclined toward the right. The guide portion 60G may extend between the front end to the rear end of the holder 60.

As depicted in FIGS. 3 to 6, a pair of front and rear side guides 75 may be disposed on the support surface 20A and may be configured to be slidable in the front-rear direction. The side guides 75 may face each other in the front-rear direction. Further, the side guides 75 may protrude vertically upward and be bent such that the side guides 75 may extend toward each other in the front-rear direction. The side guides 75 may be configured to position one or more sheets 99 placed on the document mount 9A and the support surface 20A in the front-rear direction. As depicted in FIG. 4, a sheet 99 conveyed by the automatic document conveyor mechanism 10 may pass above the reading portion 3 located at the fixed portion where the reading portion 3 may face the opening 20C, and then, be guided by the curved surface 20D and peripheral surfaces of the ejection rollers 12. Then, the sheet 99 may be further guided by the guide portion 60G of the holder 60 and pass a nip point N1 between each pair of the ejection roller 12 and the ejection pinch roller 13. After that, the sheet 99 may be further guided by the guide surface 70G that may be the upper surface of the guide member 70. Thus, the sheet 99 may reach above bent portions of the side guides 75 and stop to be conveyed. In this state, the sheet 99 may be supported by the bent portions of the side guides 75 from below while being also guided by the guide surface 70G from below. That is, the guide surface 70G and the bent portions of the side guides 75 may constitute the output portion 6. The supply portion 5 may be disposed below the output portion 6.

As depicted in FIGS. 2 and 4, the base 20, the guide member 70 and the cover 80 may define a conveyance path P1. That is, as depicted in FIG. 4, the conveyance path P1 may extend obliquely and downwardly along the inclined surface 20B from the support surface 20A and further extend above the exposed portion of the platen glass 7 through the opening 20C. In this position, a lower surface of the guide member 70 and a lower surface of the urging member 40 may define the conveyance path P1 from above. The conveyance path P1 may extend curvedly and upwardly along the curved surface 20D and the guide portion 60G and further extend toward the right. The conveyance path P1 may be configured to change a conveying direction of a sheet 99 that may be conveyed along the conveyance path P1 to a rightward direction, in this position. Then, the conveyance path P1 may further extend toward the right along the guide surface 70G of the guide member 70 and thus reach above the bent portions of the side guides 75. In this position, the cover-side guide portion 80G may face the guide surface 70G while the conveyance path P1 is interposed therebetween. The cover-side guide portion 80G may be configured to come into contact with a sheet 99 being conveyed and guide the sheet 99 toward the position above the bent portions of the side guides 75 in cooperation with the guide surface 70G.

As described above, the conveyance path P1 may be configured to direct one or more sheets 99 placed on the supply portion 5 to the reading portion 3 and further direct the sheet 99 to the output portion 6. In the illustrative embodiment, the width direction of the sheet 99 that may be conveyed along the conveyance path P1 may correspond to the front-rear direction of the image reader 1. One edge of the sheet 99 in the width direction may be a front edge of the sheet 99, and the other edge of the sheet 99 in the width direction may be a rear edge of the sheet 99.

In the conveyance path P1, a section in which the conveyance path P1 may be curved upwardly along the curved surface 20D and the guide portion 60G and change the conveying direction of the sheet 99 to the rightward direction may be referred to as a curved path C1. That is, the guide portion 60G may define a portion of the curved path C1. The base 20 may define a portion of the conveyance path P1 by, for example, the curved surface 20D, at a position upstream of the guide portion 60G in the conveyance path P1.

As depicted in FIG. 12, in each pair of the ejection roller 12 and the ejection pinch roller 13, the ejection roller 12 and the ejection pinch roller 13 may face each other to define the nip point N1 therebetween while the conveyance path P1 may be interposed therebetween. The nip point N1 may be located at a substantially end of the curved path C1. The guide portion 60G may be configured to guide the sheet 99 from a position upstream of the nip points N1 in the conveyance path P1 to the nip points N1. A guide edge 60E that may be located at a downstream position in the conveyance path P1, of the guide portion 60G may extend to the nip points N1 (see FIG. 13). The cover-side guide portion 80G may be located downstream of the nip points N1 in the conveyance path P1, that is, located to the right of the nip points N1.

The holder 60 may comprise a first support position S1 and a second support position S2. The first support position S1 may be a position where the holder 60 may be supported by the ejection rollers 12 via the respective ejection pinch rollers 13 at the respective nip points N1. The second support position S2 may be a position where the holder 60 may be supported by the base 20 with which the contact portion 60T of the holder 60 may be retained in contact. As depicted in FIG. 14, the compression coil springs 69A and 69B may be disposed in the conveyance path P1, and more specifically, between the first support position S1 and the second support position S2 in the curved path C1.

The automatic document conveyor mechanism 10 may be configured to separate, one by one, one or more sheets 99 placed on the document mount 9A and the support surface 20A constituting the supply portion 5 and convey the separated sheet 99 along the conveyance path P1 depicted in FIGS. 2 and 4 to eject the sheet 99 to the output portion 6.

More specifically, as depicted in FIG. 4, the automatic document conveyor mechanism 10 may comprise a supply roller 15, a separation roller 16, and a separation pad 16A. The supply roller 15 and the separation roller 16 may be rotatably supported by the base 20. Upper ends of the supply roller 15 and the separation roller 16 may be exposed at the left of the support surface 20A of the base 20. The separation roller 16 may be disposed downstream of the supply roller 15 in the conveyance path P1, that is, disposed to the left of the supply roller 15.

The separation pad 16A may be disposed above the separation roller 16 while the conveyance path P1 may be interposed therebetween. The separation pad 16A may be movably supported by the guide member 70 and urged toward the separation roller 16.

The supply roller 15 and the separation roller 16 may be configured to rotate and feed one or more sheets 99 placed on the document mount 9A and the support surface 20A into the conveyance path P1 while being in contact with a lowermost one of the one or more sheets 99 from below. At that time, the supply roller 15 and the separation roller 16 may be configured to separate the sheets 99 one by one when two or more sheets 99 are stacked thereon.

The automatic document conveyor mechanism 10 may comprise a first rotation shaft 11S, a plurality of, for example, three, conveyor rollers 11, a plurality of, for example, three, first pinch rollers 11P, a second rotation shaft 12S, the three ejection rollers 12, a plurality of, for example, three, second pinch rollers 12P, and the three ejection pinch rollers 13.

The first rotation shaft 11S may comprise a cylindrical shaft body extending in the front-rear direction and may be disposed above the inclined surface 20B. Front and rear ends of the first rotation shaft 11S may be rotatably supported by the base 20.

The second rotation shaft 12S may comprise a cylindrical shaft body extending in the front-rear direction and may be disposed above the curved surface 20D. Front and rear ends of the second rotation shaft 12S may be rotatably supported by the base 20.

The first rotation shaft 11S and the second rotation shaft 12S may be configured to be controlled by a control device (not depicted) to rotate in synchronization with the supply roller 15 and the separation roller 16.

The conveyor rollers 11 may be fixed on the first rotation shaft 11S and spaced apart from each other in the front-rear direction. Although not depicted in the drawings, the two other conveyor rollers 11 may be disposed as well as the conveyor roller 11 depicted in FIG. 4, wherein the other conveyor rollers 11 may be disposed in the axial direction of the conveyor roller 11 depicted in FIG. 4. The conveyor rollers 11 may face the inclined surface 20B from above while the conveyance path P1 may be interposed therebetween. The conveyor rollers 11 may be configured to be rotated by the first rotation shaft 11S.

The first pinch rollers 11P may be rotatably supported by the base 20 and spaced apart from each other in the front-rear direction. Upper ends of the first pinch rollers 11P may be exposed through the inclined surface 20B. The first pinch rollers 11P may face the corresponding conveyor rollers 11, respectively, from below while the conveyance path P1 is interposed therebetween. The first pinch rollers 11P may be urged toward the corresponding conveyor rollers 11, respectively. Although not depicted in the drawings, the two other first pinch rollers 11P may be disposed as well as the first pinch roller 11P depicted in FIG. 4, wherein the other first pinch rollers 11P may be disposed in the axial direction of the first pinch roller 11P depicted in FIG. 4. The first pinch rollers 11P may be configured to be rotated following the rotation of the corresponding conveyor rollers 11.

As depicted in FIGS. 4 and 5, the ejection rollers 12 may be fixed on the second rotation shaft 12S and spaced apart from each other in the front-rear direction. The ejection rollers 12 may face the curved surface 20D from above and the right and face the guide portion 60G of the holder 60 from below and the right while the conveyance path P1 may be interposed therebetween. In other words, the holder 60 may comprise the guide portion 60G at its surface facing the ejection rollers 12. A peripheral surface of each ejection roller 12 may define a right portion of the curved path C1. The ejection rollers 12 may be configured to be rotated by the second rotation shaft 12S.

As depicted in FIG. 4, the second pinch rollers 12P may be rotatably supported by the base 20 and spaced apart from each other in the front-rear direction. Upper ends of the second pinch rollers 12P may be exposed through the curved surface 20D. The second pinch rollers 12P may face the corresponding ejection rollers 12, respectively, from below while the conveyance path P1 may be interposed therebetween. The second pinch rollers 12P may be urged toward the corresponding ejection rollers 12, respectively. Although not depicted in the drawings, the two other second pinch rollers 12P may be disposed as well as the second pinch roller 12P depicted in FIG. 4, wherein the other second pinch rollers 12P may be disposed in the axial direction of the second pinch roller 12P depicted in FIG. 4. The second pinch rollers 12P may be configured to be rotated following the rotation of the corresponding ejection rollers 12.

As described above with reference to FIGS. 4 to 14, the ejection pinch rollers 13 may be rotatably supported by the holder 60 with being spaced apart from each other. The ejection pinch rollers 13 may face the corresponding ejection rollers 12, respectively, from above while the conveyance path P1 may be interposed therebetween. Further, each of the ejection pinch rollers 13 may be urged toward a corresponding one of the ejection rollers 12 by the compression coil springs 69A and 69B disposed between the cover 80 and the holder 60. The ejection pinch rollers 13 may be configured to be rotated following the rotation of the corresponding ejection rollers 12.

The conveyor rollers 11 and the first pinch rollers 11P may be disposed upstream of the reading portion 3 in the conveyance path P1. The ejection rollers 12, the second pinch rollers 12P, and the ejection pinch rollers 13 may be disposed downstream of the reading portion 3 in the conveyance path P1. The guide surface 70G and the cover-side guide portion 80G may be disposed downstream of the ejection rollers 12 and the ejection pinch rollers 13 in the conveyance path P1.

The conveyor rollers 11 and the first pinch rollers 11P may convey a sheet 99 fed into the conveyance path P1 by the supply roller 15 and the separation roller 16 toward the opening 20C, that is, toward the reading portion 3 located at the fixed position to pass the sheet 99 between the exposed portion of the platen glass 7 through the opening 20C and the lower surface of the urging member 40, that is, over the reading portion 3.

Then, the ejection rollers 12, the second pinch rollers 12P, and the ejection pinch rollers 13 may change the conveying direction of the sheet 99 that has passed over the reading portion 3 to the upward direction such that the sheet 99 may be U-turned in the curved path C1. The ejection rollers 12 and the ejection pinch rollers 13 may further convey the sheet 99 to a position downstream of the nip points N1 in the conveyance path P1 to eject the sheet 99 to the output portion 6. While the ejection rollers 12 and the ejection pinch rollers 13 convey the sheet 99, the guide surface 70G may guide the sheet 99 being conveyed toward the output portion 6 by making contact with the sheet 99 from below. The cover-side guide portion 80G may also guide the sheet 99 being conveyed toward the output portion 6 with being made contact with the sheet 99 from above. Thus, the sheet 99 may be ejected onto the guide surface 70G and the bent portions of the side guides 75 constituting the output portion 6. That is, the guide surface 70G may serve both as the conveyance guide for a sheet 99 and the place where one or more sheets 99 may be stacked.

As depicted in FIG. 5, a plurality of sheet lift members 6A may be disposed side by side in the front-rear direction at the left end portion of the guide surface 70G. Each sheet lift member 6A may comprise an elastic body, such as a resin film. The sheet lift members 6A may be configured to be depressed by a sheet 99, e.g., a first sheet, to allow the first sheet 99 to be ejected while the first sheet 99 is nipped between the ejection rollers 12 and the corresponding ejection pinch rollers 13 to be ejected to the output portion 6. When the first sheet 99 is disengaged from the ejection rollers 12 and the ejection pinch rollers 13 and is thus stopped to be conveyed onto the output portion 6, the sheet lift members 6A may move upward to lift a downstream edge of the first sheet 99. Thus, when the automatic document conveyor mechanism 10 conveys the next sheet 99, e.g., a second sheet, the second sheet 99 may be slid under the first sheet 99 placed on the output portion 6 at the time the second sheet 99 is ejected to the output portion 6 by the ejection rollers 12 and the corresponding ejection pinch rollers 13. With this configuration, in the image reader 1, an arrangement order of sheets 99 after a plurality of sheets 99 placed on the supply portion 5 are conveyed successively and stacked on the output portion 6 may be the same as an arrangement order of sheets 99 before the plurality of sheets 99 are conveyed.

As depicted in FIGS. 7 to 10, and 13, catch-guard portions 68 may be disposed between the guide portion 60G and the cover 80. More specifically, each of the catch-guard portions 68 may comprise a protrusion that may protrude rightward from a right end of the guide portion 60G.

The catch-guard portions 68 may be spaced apart from each other in the front-rear direction. Each of the catch-guard portions 68 may have a triangular shape when viewed in the front-rear direction. One vertex of each catch-guard portion 68 may overlap the left end portions of the ribs 88 when viewed in the front-rear direction. The catch-guard portions 68 may bridge a gap that may be present between the guide portion 60G and the cover-side guide portion 80G and extend in the front-rear direction, that is, a gap where an edge 99E of a sheet 99 may enter. With this configuration, when an edge 99E of a sheet 99 conveyed to a position downstream of the nip points N1 in the conveyance path P1 is lifted by the sheet lift members 6A and thus makes contact with the ejection pinch rollers 13, the catch-guard portions 68 may come into contact with the edge 99E of the sheet 99 to reduce entanglement of the edge 99E of the sheet 99 around the ejection pinch rollers 13.

In the image reader 1 configured as described above, when the image reader 1 reads a document placed on the support surface 8A, as depicted in FIG. 2, the scanning mechanism may operate to move the reading portion 3 in the reading unit 30 from the left end to the right end. With this movement, the reading portion 3 may read an image from the document placed on the support surface 8A. After that, the scanning mechanism may move the reading portion 3 that completed reading in the reading unit 30 from the right end to the left end to return the reading portion 3 to the original position.

When the image reader 1 reads an image from each of a plurality of sheets 99 placed on the document mount 9A and the support surface 20A constituting the supply portion 5, as depicted in FIGS. 2 and 4, the scanning mechanism may operate to move the reading portion 3 in the reading unit 30 to the fixed position that may be the left end position. After that, when the automatic document conveyor mechanism 10 conveys the plurality of sheets 99 placed on the document mount 9A and the support surface 20A successively along the conveyance path P1, the sheet 99 being conveyed may pass over the reading portion 3 located at the fixed position. While the sheet 99 passes over the reading portion 3, the reading portion 3 may read an image from the sheet 99 passing thereover. Then, the automatic document conveyor mechanism 10 may convey the sheet 99 whose image has been read to be ejected to the output portion 6 successively such that the sheet 99 to be ejected may be slid under a preceding sheet 99 that has been ejected to the output portion 6.

As described above, the image reader 1 may be allowed to selectively read an image from a document placed on the support surface 8A and an image from one or more sheets 99 placed on the supply portion 5.

In the image reader 1 according to the illustrative embodiment, as depicted in FIGS. 11 to 14, the compression coil springs 69A and 69B may be disposed between the cover 80 and the holder 60, and the guide portion 60G may be disposed at the holder 60. The compression coil springs 69A and 69B may be configured to separate the holder 60 from the cover 80 such that the ejection pinch rollers 13 may be urged toward the corresponding ejection rollers 12, respectively, when the cover 80 is located in the closed position. The guide portion 60G constituting the conveyance path P1 may be disposed at the holder 60 instead of the cover 80. Therefore, although the reaction of the compression coil springs 69A and 69B acts on the cover 80 and thus the cover 80 is deformed, the deformation of the cover 80 may have little influence on the guide portion 60G. Thus, in the image reader 1, the conveyance path P1 may define a proper sheet conveyance route. As a consequence, this configuration may ensure a stable conveyance of the sheet 99 in the route to the ejection rollers 12 and the ejection pinch rollers 13 in the conveyance path P1.

Accordingly, in the image reader 1 according to the illustrative embodiment, degradation of image reading quality may be reduced while the conveyance of the sheet 99 may be maintained stable and an occurrence of a paper jam of the sheet 99 to be ejected to the output portion 6 may be reduced.

In the image reader 1, the holder 60 may comprise the guide portion 60G at its surface facing the ejection rollers 12. With this configuration, in the image reader 1, a parts count may be reduced as compared with a case where the guide portion 60G is attached to the holder 60 as a separate part.

Further, in the image reader 1, the conveyance path P1 may comprise the curved path C1, and the portion of the curved path C1 may be composed by the guide portion 60G. With this configuration, in the image reader 1, the deformation of the cover 80 may have little influence on the guide portion 60G. Therefore, the curved path C1 may define a proper sheet conveyance route. Thus, the conveyance of the sheet 99 along the curved path C1 may be maintained stable.

In the image reader 1, the cover-side guide portion 80G disposed at the cover 80 may be configured to convey a sheet 99 at a position downstream of the nip points N1 in the conveyance path P1 in cooperation with the guide portion 60G disposed at the holder 60. Therefore, in the image reader 1, the sheet 99 may be conveyed stably along the conveyance path P1. Further, no conveyor roller may be disposed in a position downstream of the ejection rollers 12 and the ejection pinch rollers 13 in the conveyance path P1. Therefore, it may be unnecessary for the guide portion 60G to be extended to a position downstream of the nip points N1 in the conveyance path P. Thus, the sheet 99 may be guided stably to the output portion 6 by the cover-side guide portion 80G of the cover 80.

Figure 13:
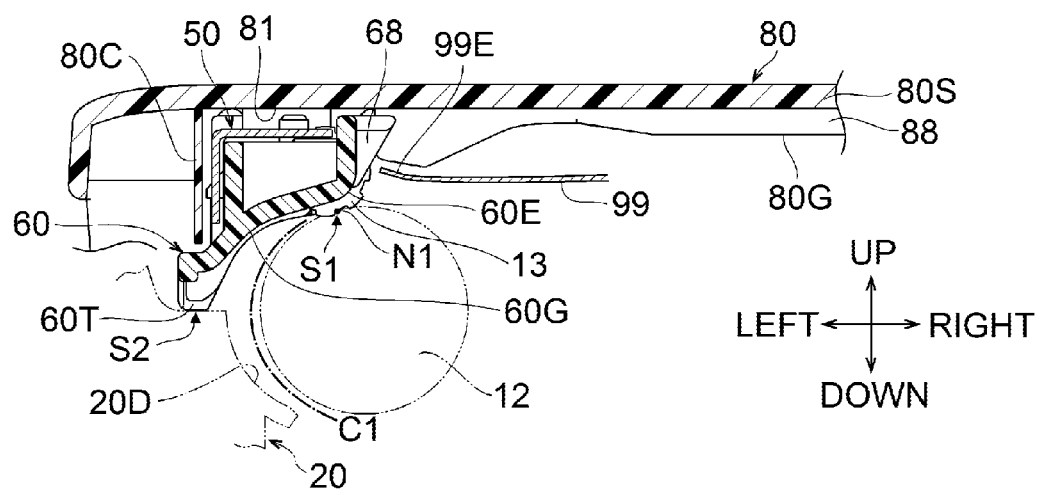
FIG. 13 is a partial cross sectional view depicting the image reader taken along line XIII-XIII in FIG. 10 in the illustrative embodiment according to one or more aspects of the disclosure.

The shape of the conveyance path P1 for guiding a sheet 99 to the nip points N1 defined between the ejection rollers 12 and the respective ejection pinch rollers 13 may be involved with the conveyance of the sheet 99 to the ejection rollers 12 and the ejection pinch rollers 13 in the conveyance path P1. In this regard, as depicted in FIG. 13, in the image reader 1, the guide portion 60G in which the guide edge 60E may extend to the nip points N1 may be configured to convey the sheet 99 stably to the nip points N1. Accordingly, this configuration may ensure a stable conveyance of the sheet 99 in the route to the ejection rollers 12 and the ejection pinch rollers 13 in the conveyance path P1.

Further, in the image reader 1, as depicted in FIG. 12, the holder 60 may be urged by the compression coil springs 69A and 69B disposed between the first support position S1 and the second support position S2 in the conveyance path P1. Thus, a posture of the holder 60 may be maintained at the first support position S1 and the second support position S2. Therefore, shaking of the holder 60 may be reduced. As a consequence, in the image reader 1, an improper sheet conveyance route may be rarely defined in the conveyance path P1 due to the limited shaking of the holder 60. And, this configuration may ensure a more stable conveyance of the sheet 99 in the route to the ejection rollers 12 and the ejection pinch roller 13.

In the image reader 1, the holder 60 may extend in the width direction of the sheet 99 to be conveyed along the conveyance path P1, that is, may have substantially the same dimension in the front-rear direction as the dimension in the width direction of the sheet 99 having a maximum size that may be available to be conveyed in the image reader 1. Further, the guide portion 60G may extend across the holder 60 from the front end to the rear end of the holder 60. With this configuration, in the image reader 1, the guide portion 60G may be configured to come into contact with the entire width of the sheet 99 being conveyed along the conveyance path P1. Thus, the sheet 99 may be guided stably in the image reader 1. Further, sheets 99 having various sizes may be also guided stably in the image reader 1.

In the image reader 1, as depicted in FIG. 11, the stiff member 50 having a stiffness higher than the holder 60 may be disposed between the holder 60 and each of the compression coil springs 69A and 69B. The stiff member 50 may be configured such that its front and rear end portions may be in contact with the compression coil springs 69A and 69B, respectively, and a portion of the stiff member 50 between its front and rear end portions may be in contact with the support portions 64A and 64B of the holder 60. When the reaction of the compression coil springs 69A and 69B acts on a middle area of the cover 80 in the front-rear direction, the cover 80 may tend to be deformed. In this regard, in the image reader 1, with the configuration described above, the reaction of the compression coil springs 69A and 69B may act on front and rear end areas, respectively, of the cover 80, and more specifically, the spring retainer portions 89A and 89B. The front and rear end areas, at which the front wall portion 80A and the rear wall portion 80B may be disposed, of the cover 80 may have strength higher than the middle area of the cover 80 in the front-rear direction. Therefore, the deformation of the cover 80 caused by the reaction of the compression coil springs 69A and 69B may be reduced. As a consequence, in the image reader 1, degradation of appearance quality of the image reader 1 due to the deformation of the cover 80 may be reduced. The steel-sheet stiff member 50 may be disposed between the holder 60 and each of the compression coil springs 69A and 69B. With this configuration, the urging force of the compression coil springs 69A and 69B may be transmitted to the entire length of the resin holder 60 in the width direction. Thus, in the image reader 1, the ejection pinch rollers 13 may be urged toward the respective ejection rollers 12 appropriately.

In the image reader 1, the holder 60 and the stiff member 50 may be in contact with each other in the up-down direction via the front support portion 64A disposed between the first pinch roller 13P and the second pinch roller 13Q and the rear support portion 64B disposed between the first pinch roller 13P and the third pinch roller 13R. With this configuration, in the image reader 1, the holder 60 may avoid be warped and the urging force of the front compression coil spring 69A and the rear compression coil spring 69B may be transmitted substantially uniformly to the ejection pinch rollers 13 (i.e., the ejection pinch rollers 13P, 13Q, and 13R) supported by the holder 60.

In the image reader 1, as depicted in FIGS. 12 and 13, the catch-guard portions 68 disposed at the respective guide edges 60E of the guide portion 60G may be configured to come into contact with an edge 99E of a sheet 99 being conveyed to the position downstream of the nip points N1 in the conveyance path P1 to restrict the entanglement of the edge 99E of the sheet 99 around the ejection pinch rollers 13. With this configuration, in the image reader 1, the entanglement of the sheet 99 around the ejection pinch rollers 13 may be prevented or reduced.

While the disclosure has been described in detail with reference to a specific embodiment thereof, this is merely an example, and various changes, arrangements and modifications may be applied therein without departing from the spirit and scope of the disclosure.

In other embodiments, for example, as depicted in FIG. 2, the image reader 1 according to the illustrative embodiment may comprise a recording unit 2 disposed below the reading unit 30 in the main body 8. The recording unit 2 may accommodate therein an image formation portion of one of an inkjet type and a laser type. In this case, the image reader 1 may be configured to perform an image forming process using the recording unit 2 as well as the image reading process, and may be an example of the sheet conveyor that may be implemented as a multifunction device.

The aspects of the disclosure may be adopted into, for example, image readers, image forming devices, or multifunction devices.

What is claimed is:

1. A sheet conveyor device comprising:
a conveyor configured to convey a sheet along a conveyance path, the conveyor comprising a conveyor roller configured to be driven to rotate;
a cover configured to be movable between a closed position where the cover covers the conveyor roller and an open position where the cover is separated from the conveyor roller to expose the conveyor roller, wherein the conveyor further comprises
a pinch roller that is urged toward the conveyor roller and is configured to be rotated following the rotation of the conveyor roller when the cover is in the closed position, wherein when the cover is in the closed position, the conveyor roller and the pinch roller face each other and define a nip point therebetween along the conveyance path, and the conveyor roller and the pinch roller are configured to convey the sheet downstream of the nip point along the conveyance path;
a holder configured to be supported by the cover and to rotatably support the pinch roller, the holder comprising a first guide portion configured to guide the sheet toward the nip point from a position upstream of the nip point along the conveyance path; and
an urging member disposed between the cover and the holder and configured to move the holder away from the cover to urge the pinch roller toward the conveyor roller when the cover is in the closed position,
wherein the first guide portion extends to a location between the pinch roller and the conveyor roller.

2. The sheet conveyor device according to claim 1, wherein the first guide portion is disposed on a surface of the holder facing the conveyor roller.

3. The sheet conveyor device according to claim 1, wherein the conveyance path comprises an upstream portion, a curved path portion and a downstream portion, where a conveying direction of the sheet makes a U-turn when the sheet is conveyed from the upstream portion through the curved path portion to the downstream portion, and
wherein the first guide portion defines a portion of the curved path portion.

4. The sheet conveyor device according to claim 1, wherein the cover comprises a second guide portion configured to guide the sheet downstream of the nip point along the conveyance path.

5. The sheet conveyor device according to claim 1, wherein the location is the nip point.

6. The sheet conveyor device according to claim 1, further comprising:
a catch-guard portion disposed between the holder and the cover,
wherein the catch-guard portion is configured to come into contact with an edge of the sheet being conveyed downstream of the nip point along the conveyance path.

7. The sheet conveyor device according to claim 1, further comprising:
means for contacting an edge of the sheet being conveyed downstream of the nip point along the conveyance path to restrict entanglement of the edge of the sheet with the pinch roller, the contacting means disposed between the holder and the cover.

8. The sheet conveyor device according to claim 1, further comprising:
a reading unit configured to read an image on the sheet conveyed by the conveyor.

9. The sheet conveyor device according to claim 1, further comprising:
an output portion configured to receive the sheet conveyed by the conveyor,
wherein the conveyor roller includes an ejection roller configured to eject the sheet conveyed by the conveyor, and
wherein the pinch roller includes an ejection pinch roller, the ejection pinch roller configured to urge against the ejection roller and rotate following rotation of the ejection roller.

10. A sheet conveyor device comprising:
a conveyor configured to convey a sheet along a conveyance path, the conveyor comprising a conveyor roller configured to be driven to rotate;
a cover configured to be movable between a closed position where the cover covers the conveyor roller and an open position where the cover is separated from the conveyor roller to expose the conveyor roller, wherein the conveyor further comprises
a pinch roller that is urged toward the conveyor roller and is configured to be rotated following the rotation of the conveyor roller when the cover is in the closed position, wherein when the cover is in the closed position, the conveyor roller and the pinch roller face each other and define a nip point therebetween along the conveyance path, and the conveyor roller and the pinch roller are configured to convey the sheet downstream of the nip point along the conveyance path;
a holder configured to be supported by the cover and to rotatably support the pinch roller, the holder comprising a first guide portion configured to guide the sheet toward the nip point from a position upstream of the nip point along the conveyance path;
an urging member disposed between the cover and the holder and configured to move the holder away from the cover to urge the pinch roller toward the conveyor roller when the cover is in the closed position; and
a base configured to support the conveyor roller rotatably, wherein the base is in contact with the holder and defines a portion of the conveyance path at a position upstream of the first guide portion when the cover is in the closed position,
wherein the holder comprises:
a first position at which the holder is supported by the conveyor roller via the pinch roller at the nip point; and
a second position at which the holder is supported by the base, and
wherein the urging member is disposed between the first position and the second position.

11. A sheet conveyor device comprising:
a conveyor configured to convey a sheet along a conveyance path, the conveyor comprising a conveyor roller configured to be driven to rotate;
a cover configured to be movable between a closed position where the cover covers the conveyor roller and an open position where the cover is separated from the conveyor roller to expose the conveyor roller, wherein the conveyor further comprises
a pinch roller that is urged toward the conveyor roller and is configured to be rotated following the rotation of the conveyor roller when the cover is in the closed position, wherein when the cover is in the closed position, the conveyor roller and the pinch roller face each other and define a nip point therebetween along the conveyance path, and the conveyor roller and the pinch roller are configured to convey the sheet downstream of the nip point along the conveyance path;
a holder configured to be supported by the cover and to rotatably support the pinch roller, the holder comprising a first guide portion configured to guide the sheet toward the nip point from a position upstream of the nip point along the conveyance path; and
an urging member disposed between the cover and the holder and configured to move the holder away from the cover to urge the pinch roller toward the conveyor roller when the cover is in the closed position,
wherein the holder includes a first end portion and a second end portion, the holder extending from the first end portion to the second end portion in a width direction of the conveyance path, and
wherein the first guide portion extends between the first end portion and the second end portion.

12. The sheet conveyor device according to claim 11, wherein the urging member comprises a first urging member disposed closer to the first end portion, and a second urging member disposed closer to the second end portion,
the sheet conveyor device further comprising:
a stiff member being disposed between the first urging member and the second urging member, and being stiffer than the holder,
wherein the stiff member is in contact with the first urging member.

13. The sheet conveyor device according to claim 12, wherein the holder comprises a rotation shaft supported rotatably, and having a length shorter than a dimension of the conveyance path in the width direction,
wherein the pinch roller comprises at least three pinch rollers comprising a first pinch roller, a second pinch roller, and a third pinch roller arranged in the width direction, wherein the first pinch roller is disposed between the second pinch roller and the third pinch roller in the width direction, the second pinch roller is disposed closest to the first end portion of the holder in the width direction, and the third pinch roller is disposed closest to the second end portion of the holder in the width direction, and
wherein the holder and the stiff member are in contact with each other between the first pinch roller and the second pinch roller.

14. The sheet conveyor device according to claim 13, wherein the holder and the stiff member are in contact with each other between the first pinch roller and the third pinch roller.

15. The sheet conveying device according to claim 13, wherein the rotation shaft is configured to support the first pinch roller, the second pinch roller and the third pinch roller.

16. The sheet conveying device according to claim 12, wherein the stiff member extends in the width direction from the first urging member to the second urging member and is in contact with the second urging member.

17. A sheet conveyor device comprising:
a conveyor configured to convey a sheet along a conveyance path, the conveyor comprising a conveyor roller;
a cover configured to be movable between a closed position where the cover covers the conveyor roller and an open position where the cover is opened to expose the conveyor roller, wherein the conveyor further comprises
a pinch roller that is moved toward the conveyor roller when the cover is in the closed position, wherein when the cover is in the closed position, the conveyor roller and the pinch roller define a nip point along the conveyance path;
a holder configured to be supported by the cover and to rotatably support the pinch roller;
an elastic member disposed between the cover and the holder and configured to move the holder away from the cover causing the pinch roller to move toward the conveyor roller when the cover is in the closed position; and
a stiff member being disposed between the cover and the holder, and being stiffer than the holder, wherein the stiff member is in contact with the elastic member.

18. The sheet conveyor device according to claim 17, wherein the holder comprises a guide portion configured to guide the sheet toward the nip point from a position upstream of the nip point along the conveyance path.

19. The sheet conveyor device according to claim 18, wherein the guide portion is disposed on a surface of the holder facing the conveyor roller.

* * * * *